(12) United States Patent
Sheller (10) Patent No.: US 7,065,663 B2
(45) Date of Patent: Jun. 20, 2006

(54) METHODS AND APPARATUS TO CONTROL POWER STATE TRANSITIONS

(75) Inventor: Nathan J. Sheller, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 10/326,732

(22) Filed: Dec. 19, 2002

(65) Prior Publication Data

US 2004/0123172 A1    Jun. 24, 2004

(51) Int. Cl.
*G06F 1/32*    (2006.01)
(52) U.S. Cl. .................................................. 713/320
(58) Field of Classification Search ............... 713/300, 713/320, 322–324
See application file for complete search history.

(56) References Cited

U.S. PATENT DOCUMENTS

| | | | |
|---|---|---|---|
| 5,560,022 A * | 9/1996 | Dunstan et al. ............. | 713/300 |
| 5,652,893 A * | 7/1997 | Ben-Meir et al. ........... | 713/310 |
| 6,721,892 B1 * | 4/2004 | Osborn et al. .............. | 713/300 |
| 6,889,331 B1 * | 5/2005 | Soerensen et al. .......... | 713/320 |
| 2003/0120962 A1 * | 6/2003 | Dai et al. .................... | 713/320 |

* cited by examiner

*Primary Examiner*—Dennis M. Butler
(74) *Attorney, Agent, or Firm*—Cindy T. Faatz (57) ABSTRACT

Methods and apparatus to control power state transitions in embedded systems are disclosed. In a disclosed method, power state transitions of agents in the system are managed by a central authority. The agents register themselves with the central authority. When a request to transition the system to a requested power state is received, the central authority issues callback instructions to the agents in the system that support the requested power state. The callback instructions are issued in a temporal order indicated by the power state dependencies of the agents. Thus, the central authority arbitrates the order in which the agents transition to the requested power state. The power state dependencies of the agents are registered with the central authority by the agents either at power-up of the system or when the agents are plugged into the system.

53 Claims, 10 Drawing Sheets

| AGENT | POWER STATE | AVAILABLE |
|---|---|---|
| Processor | Full On | ☒ |
|  | Slow | ☐ |
|  | Full Off | ☒ |
| Display | Full On | ☒ |
|  | Dim | ☒ |
|  | Backlight Off (processing graphics) | ☒ |
|  | Full Off | ☒ |
| Network | ... | ... |
| RAM | ... | ... |
| HDD | ... | ... |
| Audio | ... | ... |

FIG. 2
(PRIOR ART)

| AGENT | POWER STATE | AVAILABLE | CURRENT |
|---|---|---|---|
| Processor | Full On | ☒ | ☒ |
|  | Slow | ☐ |  |
|  | Full Off | ☒ |  |
| Display | Full On | ☒ |  |
|  | Dim | ☒ |  |
|  | Backlight Off (processing graphics) | ☒ | ☒ |
|  | Full Off | ☒ |  |
| Network | ... | ... | ... |
| RAM | ... | ... | ... |
| HDD | ... | ... | ... |
| Audio | ... | ... | ... |

| AGENT | TRANSITION | PRIORITY | CALLBACK |
|---|---|---|---|
| Processor | Full on to Slow | 1 | A1 |
| | Full on to Full Off | 1 | A2 |
| | Slow to Full On | 1 | A3 |
| | Slow to Full Off | 1 | A4 |
| | Full Off to Slow | 3 | A5 |
| | Full Off to Full On | 3 | A6 |
| Display | Full On to Dim | 0 | A7 |
| | Full On to Backlight Off (processing graphics) | 2 | B1 |
| | Full On to Full Off | 2 | B2 |
| | Dim to Full On | 2 | B3 |
| | Dim to Backlight Off (processing graphics) | X | B4 |
| | Dim to Full Off | 2 | B5 |
| | Backlight Off (processing graphics) to Full On | 2 | B6 |
| | Backlight Off (processing graphics) to Dim | 2 | B7 |
| | Backlight Off (processing graphics) to Full Off | X | B8 |
| | Full Off to Full On | 2 | B9 |
| | Full Off to Dim | 2 | B10 |
| | Full Off to Backlight Off (processing graphics) | 2 | B11 |
| Network | ... | ... | ... |
| RAM | ... | ... | ... |
| HDD | ... | ... | ... |
| Audio | ... | ... | ... |

METHODS AND APPARATUS TO CONTROL POWER STATE TRANSITIONS

FIELD OF THE DISCLOSURE

This disclosure relates generally to embedded systems, and, more particularly, to methods and apparatus to control power state transitions.

BACKGROUND

Figure 1:
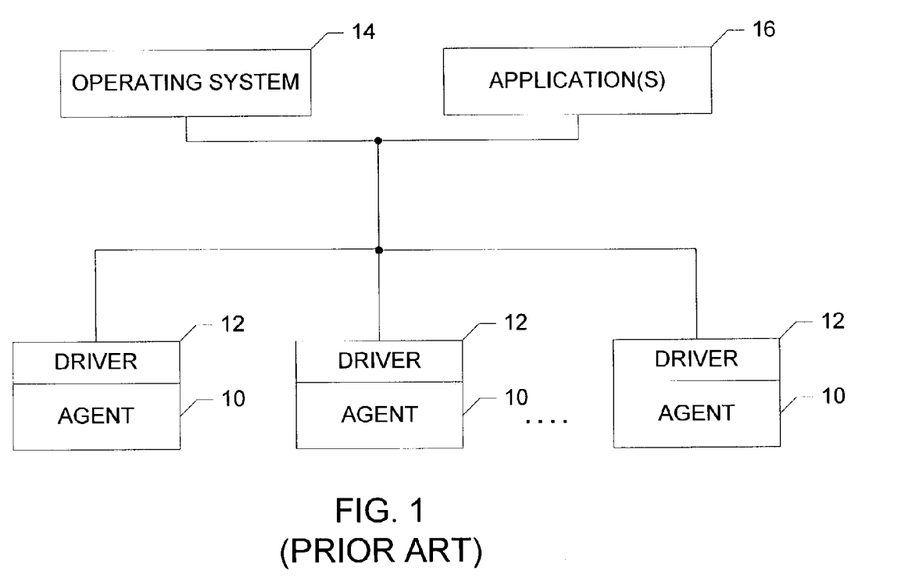
FIG. 1 is a schematic illustration of a prior art embedded system.

Prior art embedded systems typically include a plurality of power consuming agents 10 as shown in FIG. 1. For example, an embedded system such as might be found in a handheld electronic device might include agents 10 such as a processor, a display and a random access memory (RAM). When an instruction to transition the system from one power consuming level (e.g., full power) to another power consuming level (e.g., sleep) is identified, each discrete power consuming agent 10 that supports the requested power level must be independently transitioned to that requested power level. Typically, the transitions of these agents 10 to the requested power level must be carried out in one or more specific temporal orders. For example, it is often the case that a first agent should not be transitioned to a requested power state until after a second agent in the system has completed the transition to the requested power state.

In order to accommodate such order dependencies, prior art systems typically provide each agent 10 with a driver 12, usually in the form of software or firmware. The drivers 12 of the agents 10 are programmed to communicate with one another below the awareness of the operating system 14 to arbitrate the order in which the agents 10 transition to the requested power state. Thus, the drivers 12 of the agents 10 will communicate to identify any order dependencies and to ensure the agents are transitioned in accordance with the same. For example, if a first agent must be transitioned to the requested power state before a second agent can be so transitioned, the drivers 12 of the first and second agents 10 will communicate to ensure that the power transition of the second agent is not initiated until the power transition of the first agent is completed or nearly completed. In another example, the driver developer might choose to create a function on the first driver that would return only when a given power transition was completed. Then, a second driver, which requires that same power transition to complete before beginning its own transition, would directly call the private function of the first driver before proceeding with its own power transition. Another driver developer might choose to introduce a 200 ms delay before continuing with a given power transition. The resultant system is comprised of several different drivers all with different methods of resolving their own interdependencies. Thus, other agents in the system might or might not have any knowledge of the dependencies, functions, or current power states for another agent.

This prior art approach to enforcing power transition order dependencies between agents is disadvantageous in several respects. For example, there is no well defined method by which applications 16 may obtain information concerning the current power state of the agents 10 or data indicating whether the most recent power state transitions have been completed. In addition, because it is typically left open to agent developers to come up with a power transition scheme, the scheme is usually non-standard, hard to maintain, and open to possible developer error.

Some prior art systems provide a central depository storing power state data. This central depository is typically implemented by a table such as the example table shown in FIG. 2. The table of FIG. 2 includes three columns. A first column identifies the agents 10 in the system (e.g., processor, display, network, RAM, a hard disk drive (HDD), an audio device (e.g., speakers), etc.). A second column identifies the power states supported by the agents 10. A third column contains data indicating whether the power states identified in the second column are currently available.

Figure 2:
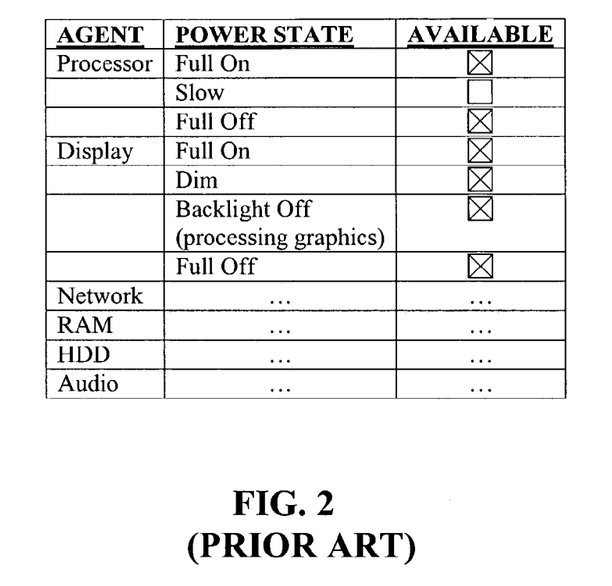
FIG. 2 is a prior art table for storing power state information.

While such a central depository is useful, it contains no data with respect to order dependencies. Thus, the agents 10 must still be provided with drivers to arbitrate order dependencies for power state transitions below the awareness of the operating system, and, thus, the issues discussed above remain.

DETAILED DESCRIPTION

Figure 3:
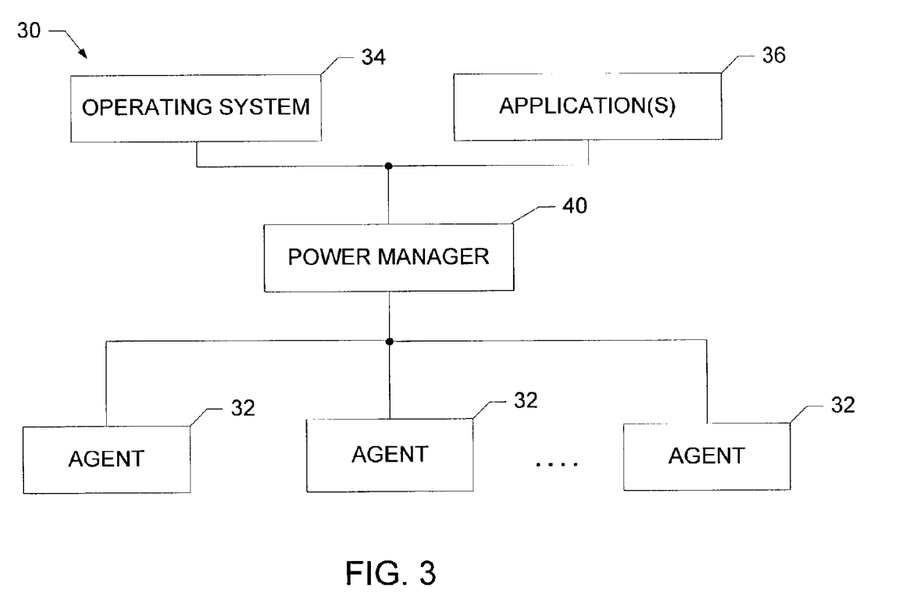
FIG. 3 is a schematic illustration of an example embedded system constructed in accordance with the teachings of the invention.

FIG. 3 is a schematic illustration of an example embedded system 30. Like the prior art system of FIG. 1, the example system of FIG. 3 includes a plurality of agents 32, an operating system 34, and one or more applications 36. The agents 32 may be implemented by any well known device such as, for example, a processor, a display, a network, a RAM, an HDD and/or an audio device. The operating system 34 may be any well known operating system such as, for example, Microsoft Windows CE.™ The applications 36 may be any application such as, for example, a word processing program, a spreadsheet program, a video game, a calendar program, etc.

Unlike the prior art system of FIG. 1, the example system 30 of FIG. 3 does not require the agents 32 to include drivers 12 to arbitrate the order of power state transitions. Instead, the system 30 of FIG. 3 includes a power manager 40 to arbitrate an order in which the agents 32 transition between power states. For example, the power manager 40 may issue instructions to the agents 32 causing the agents 32 to transition into a requested power state at specific times. For instance, if a first agent 32 must be transitioned into the requested power state before a second agent 32 can be so transitioned, the power manager 40 may issue an instruction to the first agent at a first time thereby causing the first agent to transition to the desired power state and then, after a period of time sufficient to permit the first agent to complete or nearly complete the power state transition, issue an instruction to the second agent at a second time causing the second agent to transition to the desired power state. As explained in further detail below, spacing the instructions to transition in time in this fashion can be done with any number of agents 32 in whatever order is required by the agents present in the system to perform the specific power state transition desired.

The requested power state may be a higher power state (i.e., a state in which the agent consumes more power) or a lower power state (i.e., a state in which the agent consumes less power) then the current power state of an agent. Also, two or more agents 32 in the system 30 may be in the same or different power states at substantially the same time. Thus, a request to change to a requested power state could cause two agents 32 having the same current power state to transition to the requested power state. Alternatively, a request to change to a requested power state could cause two agents 32 having different current power states to transition to the requested power state. Moreover, although in the examples described herein, the requested power state is one power state, the requested power state could alternatively comprise two or more power states. In the latter example, no more than one of the multiple power states identified in the request should be supported by any one agent 32 to avoid conflicting instructions.

Figure 4:
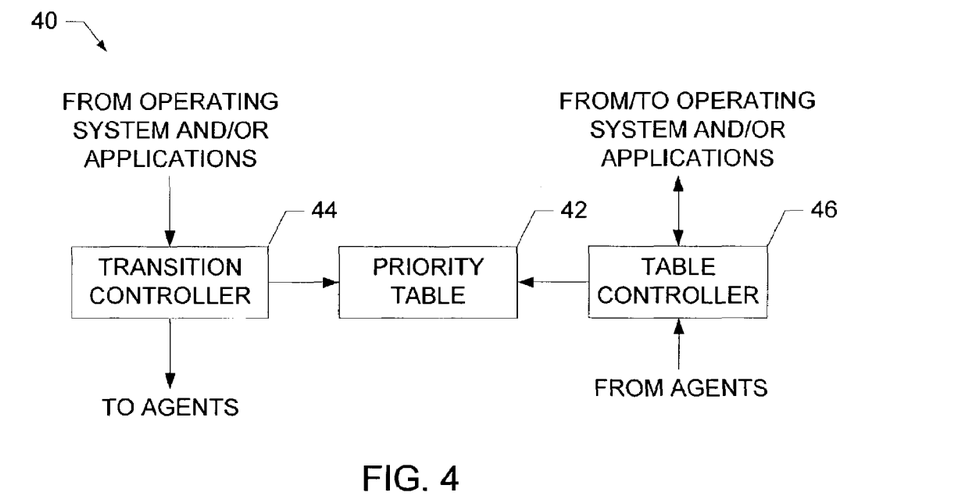
FIG. 4 is a schematic illustration of the example power manager of FIG. 3.

An example power manager 40 is illustrated in detail in FIG. 4. In the example of FIG. 4, the power manager 40 includes a priority table 42. The priority table 42 may be similar to the priority table shown in FIG. 2, but it includes additional information such as, for example, data indicating the order in which the agents 32 in the system must be transitioned when transitioning the system from a first power state to a second power state. The priority table 42 may include this data for every possible power state transition for every agent 32 present in the system.

Figure 5A:
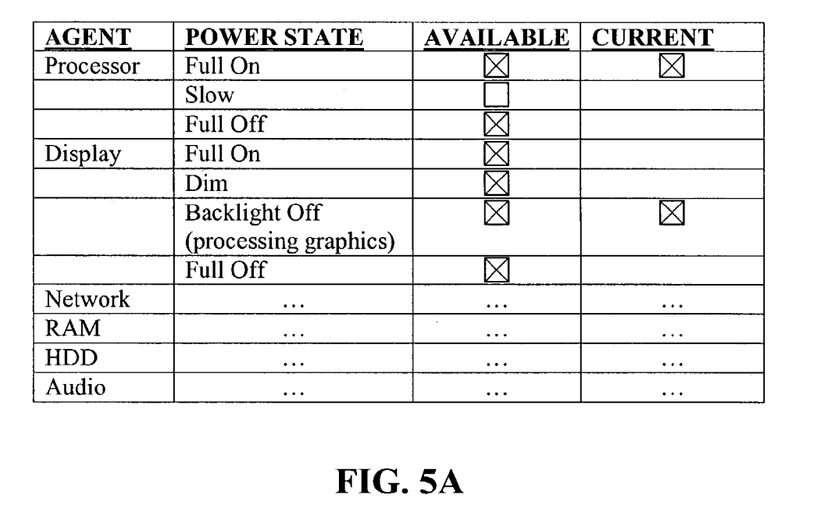
FIGS. 5A–5B are a more detailed view of the example priority table of FIG. 3.
Figure 5B:
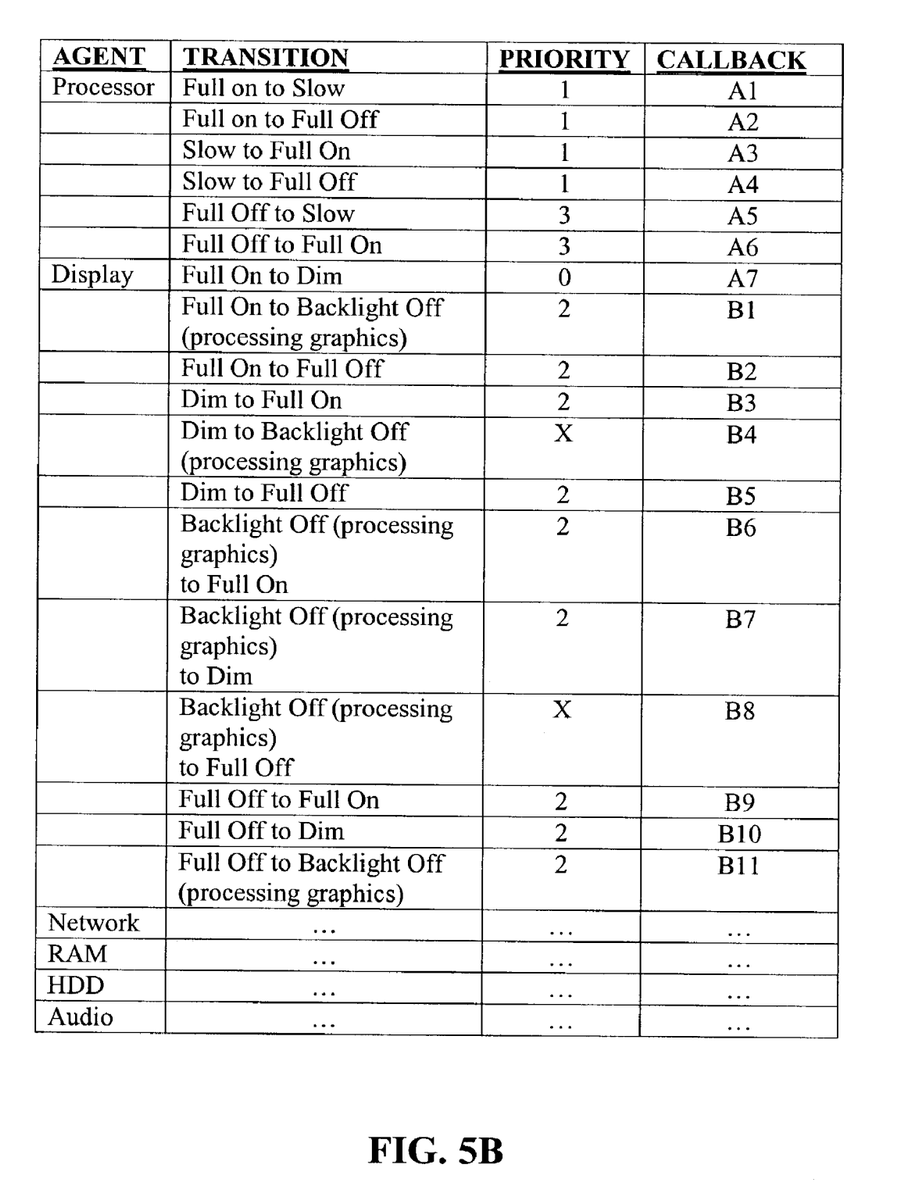

An example priority table 42 is shown in FIGS. 5A–5B. Although the example priority table 42 is shown as comprising two tables, persons of ordinary skill in the art will readily appreciate that the priority table 42 may comprise less than two tables or more than two tables.

In the illustrated example, the priority table 42 identifies each agent 32 in the system 30. For example, the table 42 of FIGS. 5A–5B identifies a processor, a display, a network connection, a RAM, an HDD and an audio device as agents 32 in the agent column. The example priority table 42 also includes a column identifying each possible power state for each agent 32 in the system. For example, in the table 42 of FIG. 5A, there are three possible power states associated with the processor, namely, full on, slow and full off.

The example priority table of FIG. 5A further includes a column indicating whether current conditions support entry into the various power states of the various agents 32 identified in the table. In the example of FIG. 5A, the processor has three possible power states as indicated by the second column of the table, but only two of those states (i.e., full on and full off) are currently available as indicated by the third column of the table. In contrast, the display has four possible power states, and all four are currently available.

The example priority table of FIG. 5A further includes a fourth column which contains data indicating the current power state of each agent in the system. This data provides a vehicle for notifying the operating system 34 and/or applications 36 executing on the system 30 of the current power state of the agents 32.

As shown in FIG. 5B, the priority table 42 also includes a transition column, a priority column and a callback column. In the illustrated example, the transition column of the table 42 identifies every possible power state transition for each agent 32 in the system 30. For example, the processor may move directly from any of its three possible power states to any of its other power states. Accordingly, the processor has six possible power state transitions. As a further example, the display has four power states and can transition directly from any of its power states to any of its other power states. As a result, the display has twelve possible transitions identified in the priority table 42.

The priority column of table 42 assigns a priority value to some or all of the power state transitions appearing in the third column of the table 42 in accordance with a predefined protocol. Each given priority value indicates the order dependency of the associated agent 32 with respect to the other agents 32 within the system 30. If two or more agents 32 have the same priority value, the agents 32 have no order dependency with respect to one another and, thus, may be transitioned to the requested power state at substantially the same time. In the illustrated example, a priority value of "1" indicates that the agent 32 associated with that priority value (e.g., the processor for the full-on-to-full-off transition) must execute the corresponding power state transition before any agent 32 with a priority value higher than "1" (e.g., the display for the full-on-to-full-off transition) is permitted to transition to the requested power state. On the other hand, a priority value of "2" indicates that the associated agent 32 (e.g., the display for the full-on-to-full-off transition) must execute the corresponding power state transition before any agent 32 with a priority value higher than "2" (e.g., the RAM) is permitted to transition to the requested power state, and also indicates that any agent 32 with a priority value lower than "2" (e.g., the processor for the full-on-to-full-off transition) must transition to the requested power state before the agent 32 associated with the priority value of 2 (e.g., the display) is permitted to transition to that power state. This protocol is followed with respect to every assigned priority value with the following exceptions.

In the illustrated example, a priority value of "0," a priority value of "X," and a blank priority value are all interpreted in the same manner. In particular, a "0", "X," or blank priority value indicates that the agent 32 associated with that priority value is order independent with respect to the other agents 32 for that particular power state transition. Thus, an agent 32 that has a "0," "X," or blank priority value may be transitioned to the requested power state at any time without consideration of the power state(s) or priority value(s) of the other agent(s) 32 in the system.

As mentioned above, the priority table 42 illustrated in FIG. 5B also includes a callback column. Each entry in the callback column identifies a callback instruction that the power manager 40 may issue to instruct a corresponding agent 32 to execute a corresponding power state transition. As shown in FIG. 5B, a different callback instruction may be used for each possible power state transition. Alternatively, some or all of the callback instructions may be the same for two or more of the power state transitions for a given agent 32.

For the purpose of controlling the power state transitions of the agents 32, the power manager 40 is further provided with a transition controller 44. The transition controller 44 is responsive to a request from the operating system 34 and/or an application 36 to transition the system 30 to a requested power state. The transition controller 44 responds to such a request by instructing the agents 32 to transition to the requested power state at times dictated by the priority values stored in the priority table 42. For example, if a request to transition the system to full off is received, the transition controller 44 identifies the current state of the agents 32 by accessing the table 42. Once the current power states of the agents are identified, the necessary transitions required to drive the agents 32 into the requested power state are identified and the corresponding priority values and callback instructions for the identified transitions are retrieved from the table 42. The priority values are then sorted and used to order the sequence in which the callback instructions are issued to the agents 32 to effect the desired power state transition. If a first agent has an order dependency on a second agent, the transition controller 44 sends an instruction to the second agent to cause the second agent to execute the necessary power transition, and then subsequently sends another instruction to the first agent to cause the first agent to execute the necessary power state transition. The order in which the transition controller 44 issues the callback instructions to the agents is dependent upon the order dependencies (if any) reflected in the priority table 42.

Persons of ordinary skill in the art will appreciate that a delay is imposed between the issuance of subsequent callback instructions to agents 32 having different priorities to ensure that the agents transition in the appropriate order. This delay can be accomplished in any desired manner. For example, it can be driven by a timer in the power manager 40 wherein the power manager 40 always waits for expiration of a predetermined time period before issuing the next callback instruction. Alternatively, each agent 32 may be structured to transmit an acknowledgement to the power manager 40 when the agent completes the requested transition. In the latter circumstance, the power manager 40 waits to receive the acknowledgement before it issue the next callback instruction. A timer may be used in the acknowledgement context to re-send the callback instruction to the agent if an acknowledgement is not received in a predetermined time period and/or to move on to the next callback instruction after an acknowledgement failure.

In an example, the power state transition callback functions are implemented as synchronous callbacks. As a result, a callback function will not return until the power state transition is completed. This implies that the power manager 40, having passed its own thread of execution to the agent by means of the callback, will not proceed with subsequent callbacks until the current agent has completed its current power transition (i.e., the callback instruction has returned). This example approach has the weakness that the power manager 40 is vulnerable to poorly written agents, which might never return and, thus, could crash the entire power manager module. However, in practice, the complexity introduced by using asynchronous power state transition callbacks far outweighs this potential crash. Also, it is unlikely that the power manager 40 can continue to function if one of the agents has ceased to function correctly in any case, so this increased vulnerability does not lead to a measurable decrease in system robustness or reliability.

By way of a more concrete example, if the requested power state is full off, the processor's current power state is full on, and the display's current power state is dim, upon accessing the priority table 42 the transition controller 44 will discover that the processor is a priority 1 agent for the full-on-to-full-off transition, and the display is a priority 2 agent for the dim-to-full-off transition. Therefore, the transition controller 44 issues the callback instruction (A2) at a first time to transition the processor from the full on state to the full off state. Subsequently, at a time sufficiently after the first time to permit the processor to enter the full off state, the transition controller 44 issues the callback instruction (B5) to transition the display to the full off state.

In contrast, if the requested power state is full on, the processor's current power state is full off, and the display's current power state is full off, upon accessing the priority table 42 the transition controller 44 will discover that the processor is a priority 3 agent for the full-off-to-full-on transition, and the display is a priority 2 agent for the full-off-to-full-on transition. Therefore, the transition controller 44 issues the callback instruction (B9) at a first time to transition the display from the full off state to the full on state. Subsequently, at a time sufficiently after the first time to permit the display to enter the full on state, the transition controller 44 issues the callback instruction (A6) to transition the processor to the full on state. Of course, the above examples are purely fanciful and are not intended to reflect an order dependency that necessarily occurs in a real world application. Instead, they are provided merely for purposes of illustrating the operating principles of the disclosed examples.

In order to populate the priority table 42, the power manager 40 is further provided with a table controller 46. As shown in FIG. 4, the table controller 46 is responsive to registering instructions received from the agents 32 to populate the priority table 42 with the data discussed above in connection with FIGS. 5A–5B. The table controller 46 is also responsive to queries received from the operating system 34 and/or the application(s) 36 to retrieve data from the priority table 42 and to provide the requesting entity (e.g., the operating system 34 and/or an application 36) with data concerning, for example, the current and/or available power state(s) of the agent(s) 32. A power state might be unavailable because, for example, the power state granularity of one agent might be finer than the granularity of another agent. For instance, the processor might have three power states, "full on", "suspend", and "off". The display might have two power states, "full on", and "off". Thus, the display does not support a "suspend" state. It is up to the developer how to treat this situation. For example, the display agent can report that it does in fact support a "suspend" state, and simply transition to "off" (or some other supported state) when requested to go to "suspend". Alternatively, the display agent can report that "suspend" is unsupported, in which case the resultant behavior would be for the display to remain in whatever state it was currently in whenever the rest of the agents transitioned to "suspend". Which behavior is preferable depends entirely on the requirements of the system. The most common implementation is for each agent to report support for all known power states, and simply re-use power states that are actually available, as appropriate (as in the first example).

Figure 6:
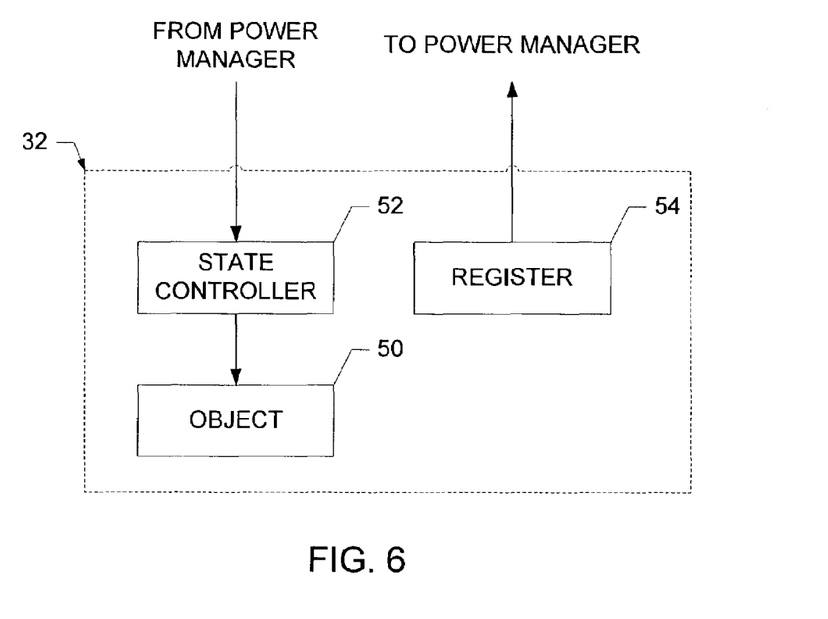
FIG. 6 is a schematic illustration of an example agent which may correspond to one or more of the agents shown in FIG. 3.

An example agent 32 is shown in FIG. 6. The example agent 32 includes an object block 50 which contains hardware, software or firmware to perform one or more functions. For example, if the agent 32 is a display, the object 50 may comprise a liquid crystal display panel. By way of another example, if the agent 32 is a hard disk drive, the object 50 may comprise a magnetic spinning medium mounted on a spindle and driven by a motor. In still another example, if the agent 32 is a processor, the object 50 may comprise the processor logic core and/or programmed instructions available to the core.

To control the power state in which the object 50 performs (or, in the case of, for example, full off, does not perform) a function, the agent 32 is further provided with a state controller 52. The state controller 52 is responsive to one or more instructions received from a central authority such as the power manager 40 to transition the object between two or more power states (e.g., full on, slow, and full off).

For the purpose of providing a central authority such as the power manager 40 with the information necessary to populate the priority table 42, the agent 32 is further provided with a register 54. The register 54 stores or has access to data which characterizes the agent 32. For example, the register 54 has access to agent characterizing data reflecting: (a) the possible power state(s) of the agent 32 it serves, (b) whether the possible power state(s) are available, (c) the current power state of the agent 32, (d) the possible power state transitions that the agent 32 can experience, (e) the priority (if any) assigned to the agent 32 for each power state transition, and (f) the callback instruction(s) the agent 32 requires to execute each of the power state transitions. Thus, the agent characterization data may include a first priority value to be assigned the agent 32 for a first power state transition and a second priority value to be assigned the agent 32 for a second power state transition. This agent characterizing data is programmed or otherwise stored in the agent 32 by the developer at inception of the agent 32.

The register 54 is structured to register its corresponding agent 32 with the power manager 40 whenever the system 30 is initialized (e.g., after a power failure, at start-up, etc), whenever the agent 32 is connected to the already running system (e.g., when the agent 32 is connected to a plug-and-play system at a time after start-up of the system) and/or periodically (e.g., to update the current power state of the agent 32 in the priority table). The register 54 responds to detection of such an event by communicating the agent characterization data (e.g., the priority data, the callback instructions for the power state transitions, etc.) to the power manager 40. In the example of FIG. 4, the agent characterization data is input to the table controller 46. The table controller 46 responds to receipt of this data by entering it into the appropriate column(s) of the priority table 42. Any known protocol may be used to communicate the agent characterization data from the agent 32 to the power manager 40 and to store that data in the priority table 42. For example, the data can be communicated as a tab delimited file.

The register 54 of the agent 32 may also be structured to operate in accordance with a known plug-and-play protocol such that the power manager 40 is kept informed of power state changes in the agent and/or removal of the agent 32 from the system 30.

A flowchart representative of example machine readable instructions for implementing the power manager 40 and the agents 32 of FIGS. 3–6 are shown in FIGS. 7A–9B. In this example, the flowchart illustrates a program for execution by a processor such as the processor 1012 shown in the example computer 1000 discussed below in connection with FIG. 10. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the power manager 40, the agents 32, the transition controller 44, the table controller 46, the state controller 52 and the register 54 could be implemented by software, hardware, and/or firmware. Further, although the example program is described with reference to the flowcharts illustrated in FIGS. 7A–9B, persons of ordinary skill in the art will readily appreciate that many other methods of implementing the example apparatus 30 may alternatively be used. For example, the order of execution of the blocks may be changed, and/or some of the blocks described may be changed, eliminated, or combined.

Figure 7A:
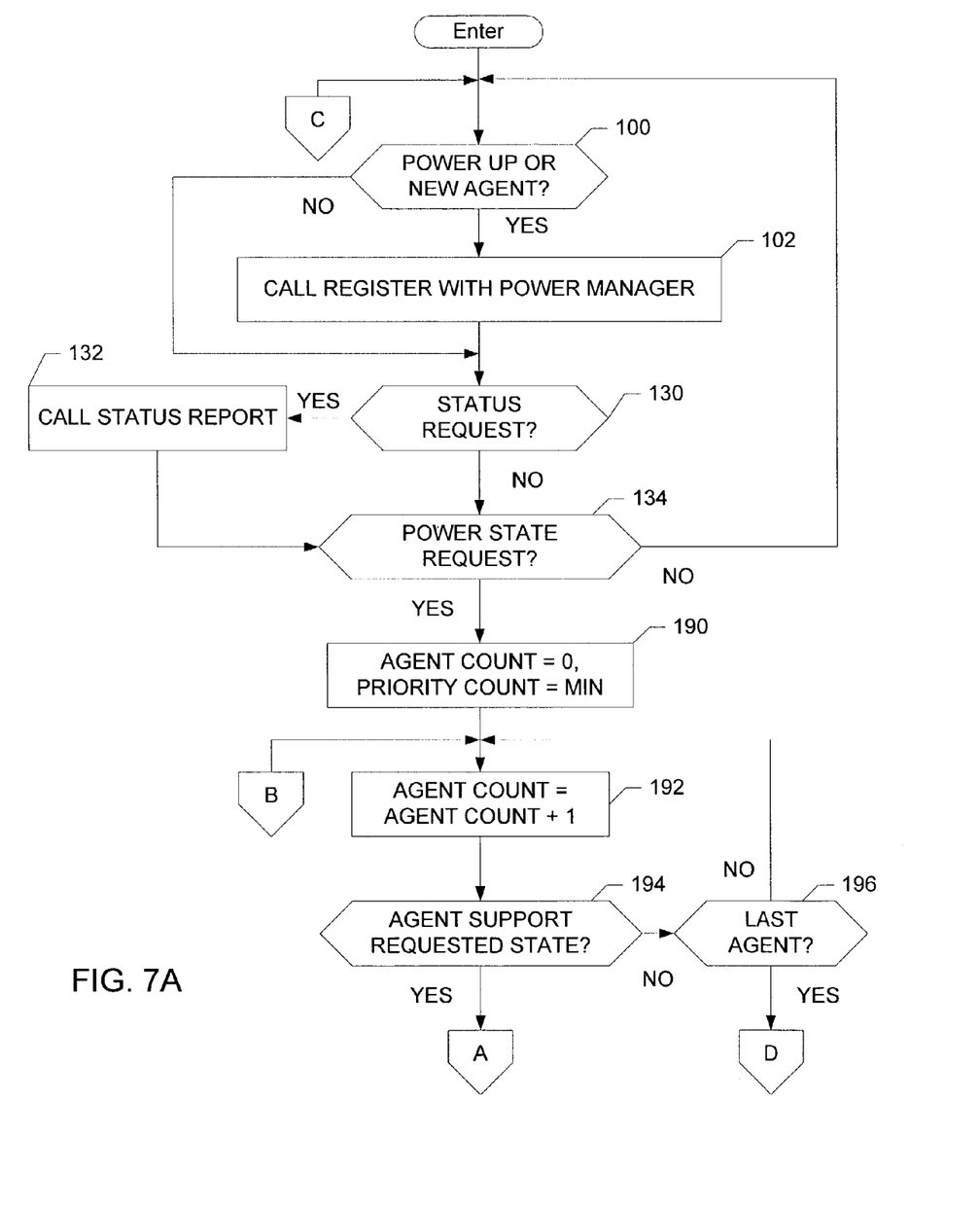
FIGS. 7A–7B are a flowchart illustrating an example program for implementing the power manager of FIG. 3.

Turning to FIG. 7A, the program begins at block 100 where the power manager 40 determines if the system 30 has recently been initialized (e.g., a power up event has recently occurred), if a new agent 32 has been added to the already running plug-and-play system 30, and/or a time to update the priority table 42 has been reached (block 100). If the system 30 has just been powered up, a new device has been plugged into the system and/or an update time has been reached (block 100), the REGISTER WITH POWER MANAGER routine is called (block 102).

Figure 8:
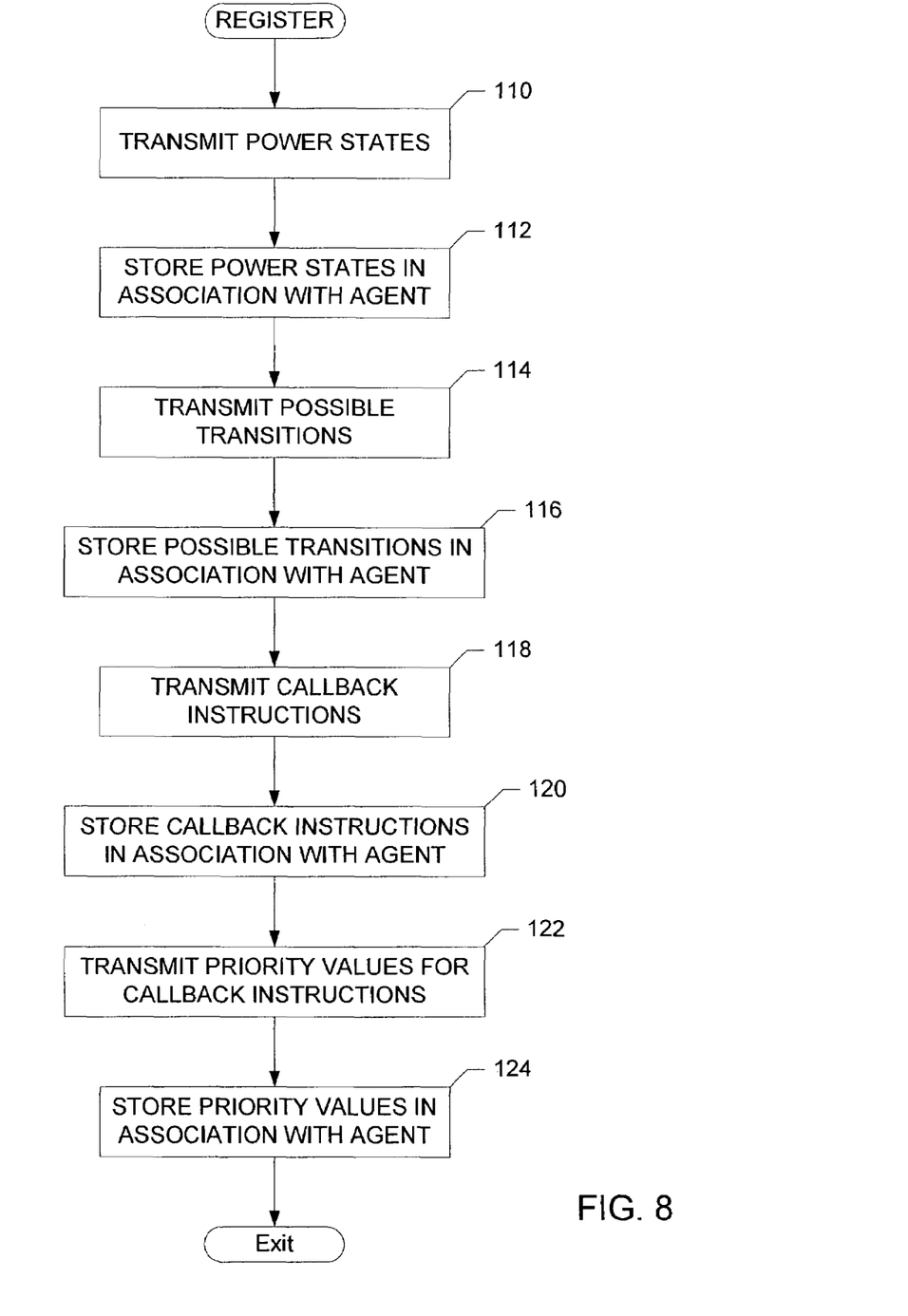
FIG. 8 is a flowchart illustrating an example program that may be used to implement the REGISTER WITH POWER MANAGER routine called in FIG. 7A.

Assuming for purposes of discussion that the REGISTER WITH POWER MANAGER routine has been called (block 102), control advances to block 110 of FIG. 8. At block 110, the register(s) 54 of the newly added agent 32 (e.g., in the plug-and-play example) or all of the agents 32 (in the power-up or time to update examples), begin to transmit the agent characterization data to the power manager 40. The REGISTER WITH POWER MANAGER routine begins when the register 54 of the new agent 32 transmits an identifier identifying the corresponding agent 32 in accordance with the plug-and-play protocol and a list of the power states supported by that agent 32 (block 110). The table controller 46 of the power manager 40 receives this data and places it into the priority table 42 if it is a new entry, or updates the table 42, if appropriate, if a corresponding entry already exists (block 112). For example, the identifier may be placed in the first column of FIG. 5A and the first column of FIG. 5B, and the supported power states may be listed in the second column of FIG. 5A.

The register 54 of the agent 32 then transmits data representative of the possible power state transitions the agent 32 is capable of undertaking (block 114). The table controller 46 of the power manager 40 receives this data and places it into the priority table 42 if it is a new entry, or updates the table 42, if appropriate, if a corresponding entry already exists (block 116). For example, the possible power state transitions may be listed in the second column of FIG. 5B.

The register 54 of the agent 32 then transmits the callback instruction(s) required to cause the agent 32 to execute the possible power state transitions (block 118). The table controller 46 of the power manager 40 receives this data and places the callback instruction(s) into the priority table 42 in association with the corresponding power state transitions if it is a new entry, or updates the table 42, if appropriate, if a corresponding entry already exists (block 120). For example, the callback instructions may be listed in the last column of FIG. 5B.

The register 54 of the agent 32 then transmits the priority values associated with the possible power state transitions to the power manager 40 (block 122). The table controller 46 of the power manager 40 receives this data and places it into the priority table 42 in association with the corresponding power state transitions if it is a new entry, or updates the table 42, if appropriate, if a corresponding entry already exists (block 124). For example, the priority values may be listed in the third column of FIG. 5B.

With the agent characterization data stored in the priority table 42, the REGISTER WITH POWER MANAGER routine terminates and control returns to block 130 of FIG. 7A.

Persons of ordinary skill in the art will readily appreciate that the REGISTER WITH POWER MANAGER routine of FIG. 8 will be repeated multiple times (e.g., one time for every agent 32 in the system 30) at every power up event unless the priority table 42 is stored in a persistent memory. Similarly, although for ease of explanation, the transfer of data between the agent 32 and the power manager 40 is illustrated as occurring in a parsed, handshaking fashion, persons of ordinary skill in the art will readily appreciate that the data transfer can be conducted in any desired manner. For example, all of the agent characterization data may be transmitted at once in a single data stream from the agent 32 to the power manager 40. The power manager 40 could then buffer the data stream and parse it as resources permit.

Returning to FIG. 7A and assuming that the agents 32 have all registered with the power manager 40 (block 102), or that no power up event, no update event, and/or no addition of a new device has occurred recently (block 100), control advances to block 130. At block 130, the power manger 40 determines if a status request has been received from the operating system 34 and/or an application 36. If a status request has been received, the STATUS REPORT routine is called (block 132). Otherwise, control advances to block 134.

Figure 9A:
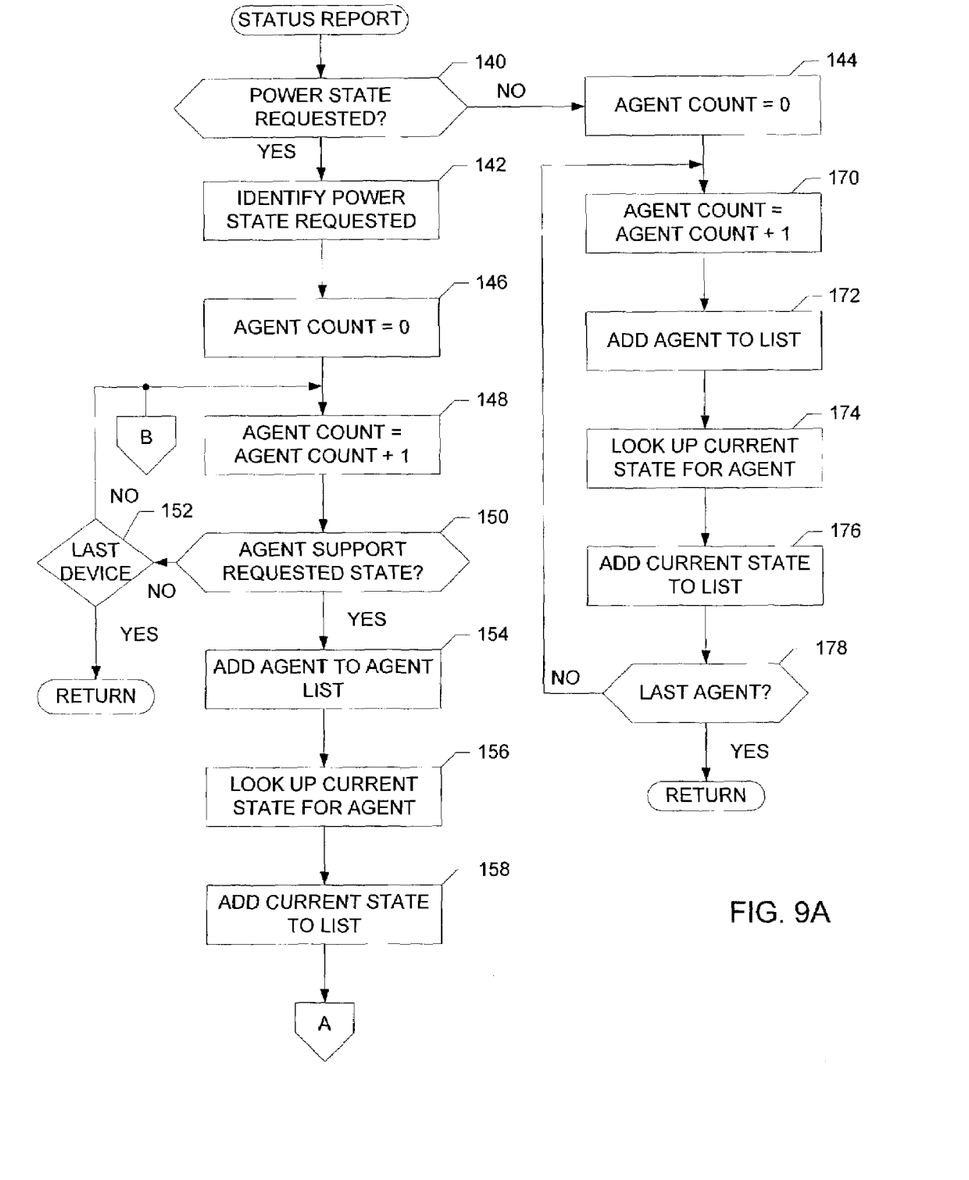
FIGS. 9A–9B are a flowchart illustrating an example program that may be used to implement the STATUS REPORT routine called in FIG. 7A.

Assuming for purposes of discussion that a status request has been received (block 130), the STATUS REPORT routine begins when the power manger 40 determines if the received request is a request to identify the agent(s) 32 available for transition to a particular power state (block 140, FIG. 9A). If so, control advances to block 142. Otherwise, it is assumed that the request is for a report of the current power states of the agents 32 in the system 30 and control advances to block 144.

Assuming for purposes of illustration that the request is a request to identify the agent(s) 32 available for transition to a particular power state (block 140), the power manager 40 identifies the particular power state that the request is identifying (block 142). The power manager 20 then initializes an agent count equal to zero (block 146). The agent count is incremented (block 148) and the priority table 42 is accessed to retrieve the entry corresponding to the agent count therefrom. If the priority table 42 indicates that the agent 32 pointed to by the agent count does not support the requested power state (block 150), control advances to block 152 where the table controller 46 of the power manager 40 determines if the last agent 32 identified in the priority table 42 has been examined. If not, control returns to block 148 where the agent count is incremented to point to the next agent 32 appearing in the table 42. Otherwise, the STATUS REPORT routine terminates and control returns to block 134 of FIG. 7A.

Assuming for purposes of illustration that an agent 32 which supports the requested power state is identified in the priority table 42 (block 150), the table controller 46 then adds the identifier of that agent 32 to a running list of agents that support the requested power state (block 154). The table controller 46 then retrieves the current power state of the agent 32 that supports the requested power state from the priority table 42 (block 156) and adds that data to the running list in association with the agent's identifier (block 158).

Figure 9B:
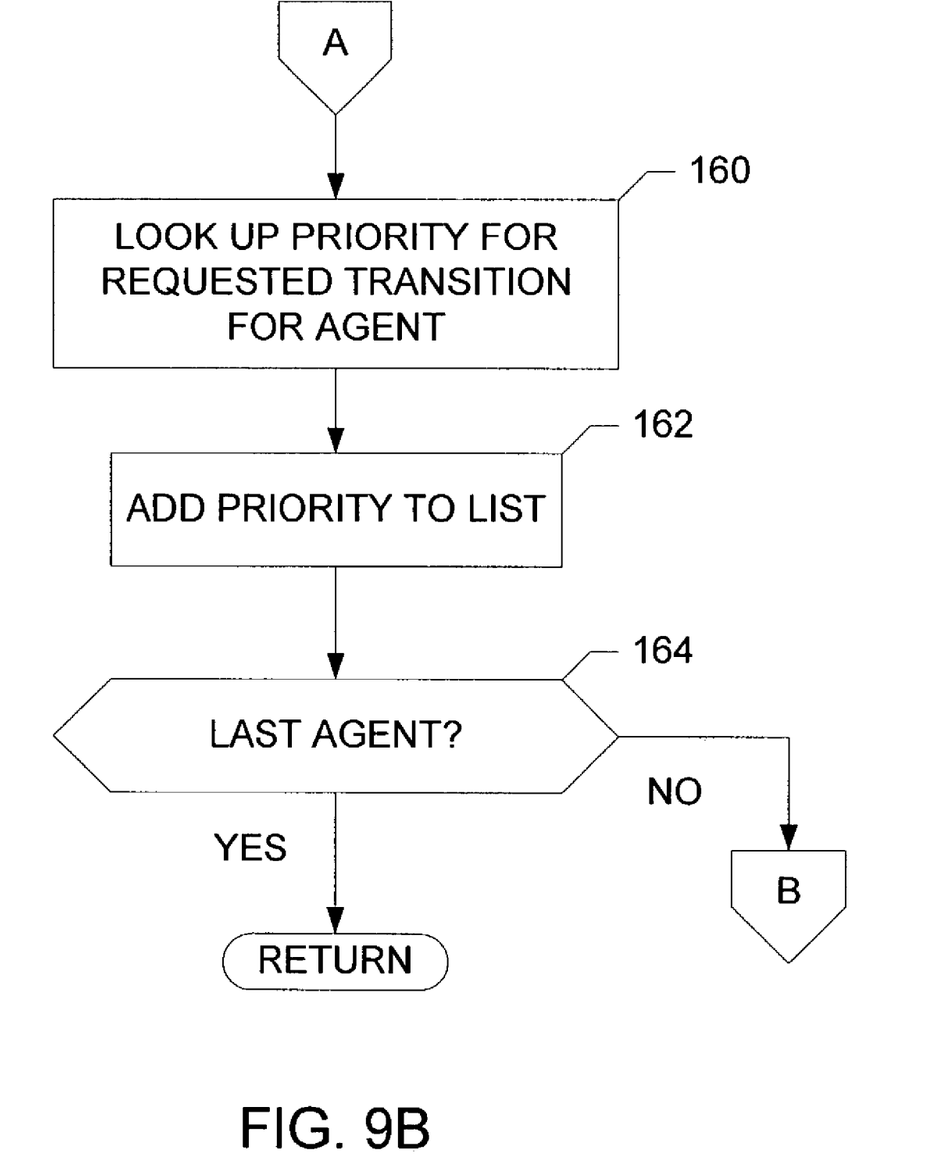

The table controller 46 then uses the data reflecting the current state (e.g., full off) of the agent 32 that supports the requested state (e.g., full on) to identify the power state transition required to move the agent 32 from the current state to the requested state. The table controller 46 uses the identity of the needed power state transition (e.g., full off to full on) to access the priority table 42 to look up the priority value associated with that transition (FIG. 9B, block 160). Once retrieved, the priority value is added to the list in association with the corresponding agent (block 162). The table controller 46 then determines if every agent 32 in the priority table 42 has been examined to determine if it supports the requested power state (block 164). If every agent 32 entry in the list has not yet been examined (block 164), control returns to block 148 where the agent count is incremented and the next agent entry is examined (block 150). Control continues to loop through blocks 148–164 until every agent in the priority table 42 has been examined (block 152 and/or block 164). When every agent in the table 42 has been tested to see if it supports the requested power state, the list of agents supporting the requested power state is complete. Therefore, the list is output to the requesting entity (i.e., the operating system 34 and/or an application 36), the STATUS REPORT routine terminates, and control returns to block 134 of FIG. 7A.

Returning to block 140 of FIG. 9A, if the status request is not a request to identify the agent(s) 32 available for transition to a particular power state, control advances to block 144. At block 144, the table controller 46 resets the agent count to zero. The agent count is then incremented (block 170), and the agent identifier appearing at the position (e.g., the table row) in the priority table 42 pointed to by the agent count is added to a running list (block 172). The table controller 46 then retrieves the current power state of the agent 32 appearing at the position in the priority table 42 pointed to by the agent count from the priority table 42 (block 174) and adds that data to the running list in association with the agent's identifier (block 176).

The table controller 46 then determines if every agent 32 in the priority table 42 has been added to the running list (block 178). If every agent 32 entry is in the running list (block 178), control returns to block 170 where the agent count is incremented and the next agent entry is retrieved from the priority table 42 for inclusion in the running list (block 172). Control continues to loop through blocks 170–178 until every agent in the priority table 42 has been retrieved (block 178). When every agent in the table 42 has been retrieved, the list of agents 32 and their current power states is complete. Therefore, that list is output to the requesting entity (i.e., the operating system 34 and/or an application 36), the STATUS REPORT routine terminates, and control returns to block 134 of FIG. 7A.

At block 134 (FIG. 7A), the power manager 40 determines if a request to enter a new power state has been received. If not, control returns to block 100. Otherwise control proceeds to block 190. Control continues to loop through blocks 100–134 until a new agent 32 is added to the system (block 100), a time to update is reached, a power up event occurs (block 100), a status request is received (block 130), or a request to change power states is received (block 134).

Figure 7B:
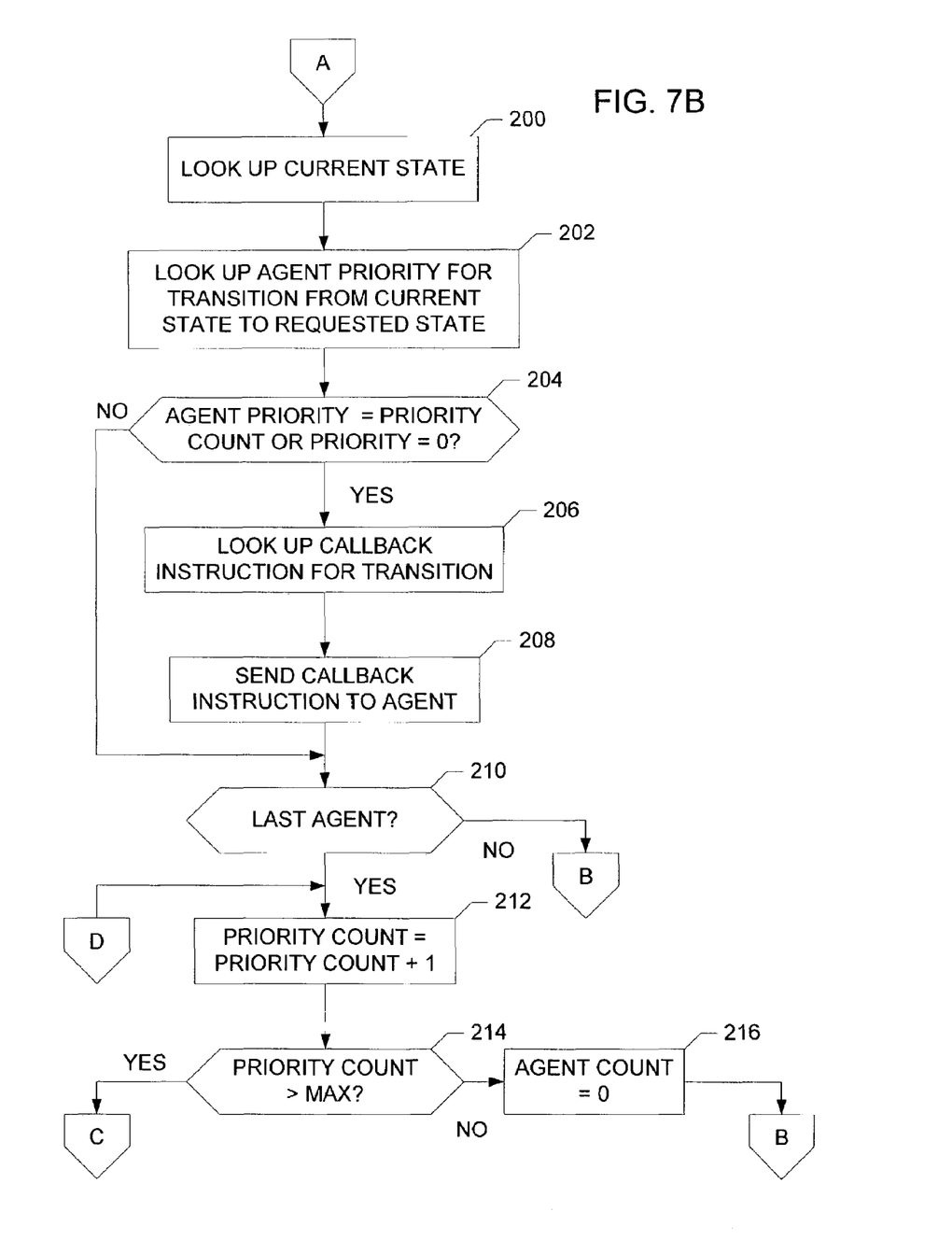

Assuming for purposes of discussion that a request to change the power state of the system 30 is received by the power manager 40 (block 134), the transition controller 44 of the power manager 40 resets the agent count to zero and the priority count to a minimum value (e.g., zero) (block 190). The agent count is then incremented (block 192) and the priority table 42 is accessed to determine if the agent associated with the location in the priority table pointed to by the agent count currently supports the requested power state (block 194). If the agent 32 identifed by the agent count does not support the requested power state (block 194), control advances to block 196 where the transition controller 44 determines if the last agent 32 appearing in the priority table 42 has been examined. If the last agent appearing in the priority table 42 has not been examined (block 196), control returns to block 192 where the agent count is incremented. Otherwise, control advances from block 196 to block 212 (FIG. 7B). Control continues to loop through blocks 192–196 until every agent 32 appearing in the priority table 42 and supporting the requested power state has been identified.

Assuming for purposes of discussion that an agent 32 supporting the requested power state has been identified (block 194), control advances to block 200 (FIG. 7B). At block 200, the transition controller 44 accesses the priority table 42 to identify the current power state of the agent pointed to by the agent count. The transition controller 44 then knows the current state of the agent 32 and the requested state of the agent 32. Thus, the transition controller 44 knows the transition (e.g., full on to full off) needed to change the power state of the agent 32 in question. It then accesses the priority table 42 to retrieve the priority value associated with that power state transition (block 202).

The transition controller 44 compares the retrieved priority value to the priority count (block 204). If the retrieved priority value equals the current priority count, the retrieved priority value is blank, or the retrieved priority count is "X" (i.e., don't care) (block 204), the transition controller 44 retrieves the callback instruction for the power state transition associated with the retrieved priority value (block 206), and sends the retrieved callback instruction to the corresponding agent 32 to initiate the transition of the agent 32 to the requested power state (block 208). After a suitable delay (i.e., a timed delay or a delay terminated by receipt of an acknowledgment signal from the agent being transitioned), control advances to block 210.

If, on the other hand, the retrieved priority value does not equal the current priority count (block 204), control advances directly from block 204 to block 210.

Regardless of how control arrives at block 210, at block 210 the transition controller 44 determines if the agent count has reached the bottom of the priority table 42. If not, control returns to block 192 (FIG. 7A) where the agent count is incremented to begin examination of the next agent in the priority table 42. If, on the other hand, the agent count has reached the bottom of the priority table 42 (block 210), the priority count is incremented (block 212). The transition controller 44 then determines if the priority count has exceeded a maximum value (e.g., three). If not, the agent count is reset to zero (block 216), and control returns to block 192. Control continues to loop through blocks 192–216 until the priority value exceeds the maximum priority value (block 214). When this occurs, control returns to block 100 of FIG. 7A.

Figure 10:
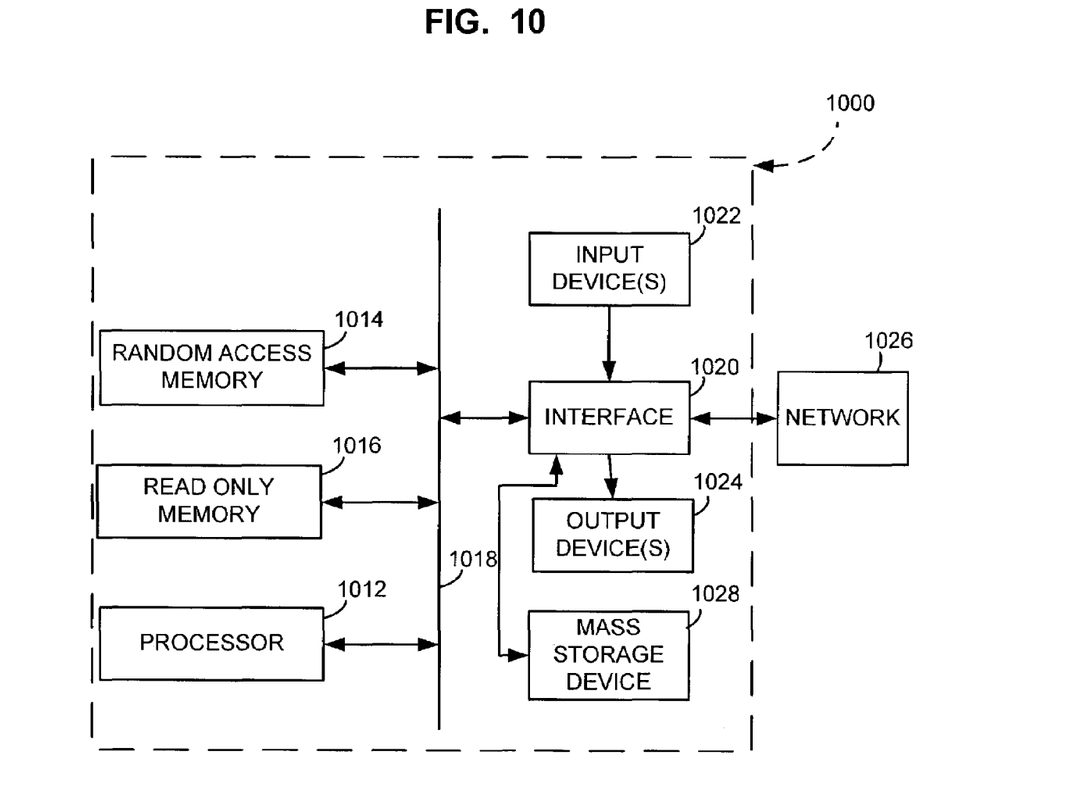
FIG. 10 is a schematic illustration of an example implementation of the system of FIG. 3.

FIG. 10 is a block diagram of an example embedded system 1000 capable of implementing the apparatus and methods disclosed herein. The system 1000 can be any embedded system including, for example, a personal digital assistant (PDA), an Internet appliance, or any other type of computing device.

The system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The system 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The system 1000 also includes one or more mass storage devices 1028 for storing software and data. Examples of such mass storage devices 1028 include floppy disk drives, hard drive disks, compact disk drives and digital versatile disk (DVD) drives.

Any of the various elements of the system 1000 may comprise an agent 32 in the example of FIG. 3. For example, any of the processor 1012, the volatile memory 1014, the non-volatile memory 1016, the bus 1018, the interface circuit 1020, the input devices 1022, the output devices 1024, the communication device, the network 1026, and/or the mass storage devices 1028 may be one or more of the agents 32 shown in FIG. 3.

From the foregoing, persons of ordinary skill in the art will readily appreciate that the above described example methods and example apparatus are advantageous over the prior art. For example, some of the example methods and apparatus provide discrete knowledge of exactly how to move a particular agent to a particular power state, as well as definitive knowledge of each agent's current power state. Because the power manager 40 can correctly track current power states, and can act as an accurate source of power state availability, applications 36 can more effectively control power state transitions. In particular, applications 36 are better able to monitor user activity and to determine appropriate times for power savings more intelligently. This results in a better user experience, better power management, and longer life on the same battery.

Furthermore, because agents 32 are structured to contain their priority value(s) for the power state transition(s) they support and to register themselves with the power manager 40 upon their insertion into the system 30, agents 32 may be added or removed from the system 30 at any time without having to change the scheme for determining the order of power transitions. This feature is useful in open architectures where consumers are able to add and remove components such as network adapters, cameras, keyboards, etc. at will. Moreover, the disclosed example methods and apparatus, allow developers to choose a priority for the agent they develop.

Although the above examples focus on moving the system 30 to a new power level in response to a request, persons of ordinary skill in the art will readily appreciate that the disclosed methods and apparatus can be modified to alternatively or additionally respond to a request to move one or more specified agent(s) 32 to a requested power level.

Although certain example methods and apparatus constructed in accordance with the teachings of the invention have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method of controlling power state transitions in a device, the method comprising:
   receiving a request to change to a requested power state;
   identifying a first agent and a second agent that support the requested power state;
   addressing a priority table to determine if the first agent has an order dependency with respect to the second agent for transitioning from a current power state of the first agent to the requested power state; and
   if the first agent has an order dependency with respect to the second agent, changing a current power state of the second agent to the requested power state at a first time and changing the current power state of the first agent to the requested power state at a second time.

2. A method as defined in claim 1 wherein the requested power state is lower than the current power state of the first agent.

3. A method as defined in claim 1 wherein the requested power state is higher than the current power state of the first agent.

4. A method as defined in claim 1 further comprising generating the request to change to the requested power state.

5. A method as defined in claim 4 wherein at least one of an operating system and an application generates the request to change to the requested power state.

6. A method as defined in claim 1 wherein the first time is before the second time.

7. A method as defined in claim 1 wherein the first time is after the second time.

8. A method as defined in claim 1 wherein the priority table stores data identifying: (a) the first agent, (b) the second agent, (c) the current power state of the first agent, (d) the current power state of the second agent, (e) a priority value for transitioning the first agent from the current power state of the first agent to the requested power state, and (f) a priority value for transitioning the second agent from the current power state of the second agent to the requested power state.

9. A method as defined in claim 8 wherein if the priority value for the first agent has a predefined value, changing the current power state of the first agent to the requested power state irrespective of a time at which the current power state of the second agent is changed to the requested power state.

10. A method as defined in claim 1 further comprising:
    identifying a third agent that supports the requested power state;
    addressing the priority table to determine if the first agent has an order dependency with respect to the third agent for transitioning from a current power state of the first agent to the requested power state.

11. A method as defined in claim 10 further comprising, if the first agent has an order dependency with respect to the third agent, changing a current power state of the third agent to the requested power state at a third time.

12. A method as defined in claim 11 wherein the second time is before the third time.

13. A method as defined in claim 12 wherein the first time is before the third time.

14. A device comprising:
    a first agent and a second agent;
    a manager having access to a priority table to instruct the first agent to change from a first power state to a second power state at a first time and the second agent to change from a third power state to a fourth power state at a second time, wherein the order of the first time and the second time is specified in the priority table.

15. A device as defined in claim 14 wherein the first power state is identical to the third power state.

16. A device as defined in claim 14 wherein the second power state is identical to the fourth power state.

17. A device as defined in claim 14 wherein the first power state is different from the third power state.

18. A device as defined in claim 14 wherein the first agent consumes more power in the first power state than in the second power state.

19. A device as defined in claim 18 wherein the second agent consumes more power in the third power state than in the fourth power state.

20. A device as defined in claim 14 wherein the first agent consumes less power in the first power state than in the second power state.

21. A device as defined in claim 20 wherein the second agent consumes less power in the third power state than in the fourth power state.

22. A device as defined in claim 14 wherein if the first agent has an order dependency on the second agent, the first time is before the second time.

23. A tangible medium storing machine readable instructions which, when executed by a processor cause a machine to:
    receive a request to change a power state; and
    if a first agent is identified in a priority table as having an order dependency with respect to a second agent, changing the power state of the first agent at a first time and changing the power state of the second agent at a second time.

24. A tangible medium as defined in claim 23 wherein the priority table stores data identifying the first agent, the second agent, a current power state of the first agent, a current power state of the second agent, a priority value for the first agent, and a priority value for the second agent.

25. A tangible medium as defined in claim 24 wherein, if the priority value of the second agent is identical to the priority value of the first agent, the machine readable instructions cause the machine to change the power state of the first agent and the power state of the second agent at substantially the same time.

26. A tangible medium as defined in claim 24 wherein if the priority value for the first agent has a predefined value indicative of no priority, the machine readable instructions cause the machine to change the power state of the first agent irrespective of the time at which the power state of any other agent is changed.

27. A tangible medium as defined in claim 23 wherein if the first agent is identified in the priority table as having an order dependency with respect to a third agent, the machine readable instructions cause the machine to change the power state of the third agent at a third time and to change the power state of the first agent at a fourth time.

28. A method of controlling power consumption in a device, the method comprising:
   receiving a request to change a power state of a first agent; and
   if a second agent is identified in a priority table as having an order dependency with respect to the first agent, changing the power state of the second agent at a first time and changing the power state of the first agent at a second time.

29. A method as defined in claim 28 wherein the first time is before the second time.

30. A method as defined in claim 28 wherein the priority table stores data identifying the first agent, the second agent, a current power state of the first agent, a current power state of the second agent, a priority value for the first agent, and a priority value for the second agent.

31. A method as defined in claim 30 further comprising, if the priority value of the second agent is identical to the priority value of the first agent, changing the power state of the first agent and changing the power state of the second agent at substantially the same time.

32. A method as defined in claim 30 wherein if the priority value of the first agent is lower than the priority value of the second agent, changing the power state of the first agent without changing the power state of the second agent.

33. A method of controlling power state transitions comprising:
   receiving a first callback instruction from a first agent, the first callback instruction instructing the first agent to transition from a first power state to a second power state;
   storing the first callback instruction in a priority table in association with the first agent;
   receiving a first priority value from the first agent indicating a priority to be given the first agent in transitioning from the first power state to the second power state;
   storing the first priority value in the priority table in association with the first agent;
   determining a first time to transition to the second power state, the first time being dependent on the priority value stored in association with the first agent; and
   transmitting the first callback instruction to the first agent at the first time.

34. A method as defined in claim 33 wherein determining a first time comprises receiving a request to transition to the second power state.

35. A method as defined in claim 33 further comprising:
   receiving a second callback instruction from a second agent, the second callback instruction instructing the second agent to transition from a third power state to the second power state;
   storing the second callback instruction in the priority table in association with the second agent;
   receiving a second priority value from the second agent indicating a priority to be given the second agent in transitioning from the third power state to the second power state;
   storing the second priority value in the priority table in association with the second agent;
   receiving a request to transition to the second power state; and
   transmitting the second callback instruction to the second agent at a second time dependent on the priority value stored in association with the second agent and the priority value stored in association with the first agent.

36. A method as defined in claim 35 wherein the first time is before the second time if the priority value of the first agent is lower than the priority value of the second agent.

37. A method as defined in claim 33 further comprising:
   receiving a second callback instruction from the first agent, the second callback instruction instructing the first agent to transition from the first power state to a third power state;
   storing the second callback instruction in the priority table in association with the first agent;
   receiving a second priority value from the first agent indicating a priority to be given the first agent in transitioning from the first power state to the third power state; and
   storing the second priority value in the priority table in association with the first agent.

38. A method as defined in claim 33 further comprising:
   receiving a second callback instruction from the first agent, the second callback instruction instructing the first agent to transition from the second power state to a third power state;
   storing the second callback instruction in the priority table in association with the first agent;
   receiving a second priority value from the first agent indicating a priority to be given the first agent in transitioning from the second power state to the third power state; and
   storing the second priority value in the priority table in association with the first agent.

39. A method as defined in claim 38 wherein the third power state is identical to the first power state.

40. A method as defined in claim 38 wherein the third power state is different from the first power state.

41. A method of registering a first agent with a power manager comprising:
   transmitting a first callback instruction from the first agent to the power manager, the first callback instructing instructing the first agent to transition from a first power state to a second power state; and
   transmitting a first priority value from the first agent to the power manager indicating a priority to be given the first agent in transitioning from the first power state to the second power state.

42. A method as defined in claim 41 further comprising:
   receiving the first callback instruction at the first agent at a first time dependent on the priority value transmitted to the power manager; and
   transitioning the first agent from the first power state to the second power state.

43. A method as defined in claim 42 further comprising:
   transmitting a second callback instruction from the first agent to the power manager, the second callback instruction instructing the first agent to transition from the first power state to a third power state; and
   transmitting a second priority value from the first agent to the power manager, the second priority value indicating a priority to be given the first agent in transitioning from the first power state to the third power state.

44. A method as defined in claim 42 further comprising:

transmitting a second callback instruction from the first agent to the power manager, the second callback instruction instructing the first agent to transition from the second power state to a third power state; and transmitting a second priority value from the first agent to the power manager, the second priority value indicating a priority to be given the first agent in transitioning from the second power state to the third power state.

45. A method as defined in claim 44 wherein the third power state is identical to the first power state.

46. A method as defined in claim 44 wherein the third power state is different from the first power state.

47. For use in a system having a first agent and a second agent, an apparatus to control power state transitions comprising:

a priority table to store data indicating a priority of a first device when transitioning from a first power state to a second power state, and a priority of a second device when transitioning from a third power state to the second power state; and a transition controller responsive to a request to transition to the second power state to instruct the first agent to transition to the second power state at a first time and to instruct the second agent to transition to the second power state at a second time, the temporal order of the first and second times being dependent upon the priorities in the priority table.

48. An apparatus as defined in claim 47 further comprising a table controller to populate the priority table with data provided by the first and second agents.

49. An apparatus as defined in claim 48 wherein the first and second agents register themselves with the apparatus in response to at least one of: (a) a power-up of the system and (b) being connected to the system at a time after power-up of the system.

50. For use in a system having a central authority to control power state transitions, an agent comprising:

an object to perform a function;

a state controller responsive to at least one instruction from the central authority to transition the object between a first power state and a second power state; and a register to provide the central authority with the at least one instruction.

51. An agent as defined in claim 50 wherein the register provides the at least one instruction in response to at least one of: (a) power-up of the system and (b) being connected to the system at a time after power-up of the system.

52. An agent as defined in claim 50 wherein the register provides the central authority with a first value indicating a relative priority to be assigned the agent in instructing the agent to transition from the first power state to the second power state.

53. An agent as defined in claim 52 wherein the register provides the central authority with a second value indicating a relative priority to be assigned the agent in instructing the agent to transition from the second power state to the first power state.

* * * * *